United States Patent [19]
Cramer et al.

[11] Patent Number: 5,606,497
[45] Date of Patent: *Feb. 25, 1997

[54] METHOD AND APPARATUS FOR RECORDING BILLABLE TIME AND SERVICES

[76] Inventors: Milton L. Cramer, Box 455, Torrington, Conn. 06790; Alfred J. Santos, 8 Tanglewood Rd., Farmington, Conn. 06032

[*] Notice: The term of this patent shall not extend beyond the expiration date of Pat. No. 5,493,492.

[21] Appl. No.: 602,455

[22] Filed: Feb. 16, 1996

Related U.S. Application Data

[63] Continuation of Ser. No. 219,998, Mar. 30, 1994, Pat. No. 5,493,492.

[51] Int. Cl.$^6$ .................................................. G06F 17/60
[52] U.S. Cl. ................ 395/232; 364/705.06; 364/709.04; 395/207
[58] Field of Search ..................... 364/401, 402, 364/406, 464.01, 705.06, 705.07, 705.08, 709.01, 709.04, 709.06, 709.08, 710.04, 401 R; 235/376, 377, 378, 472; 368/1, 9, 10, 107, 111

[56] References Cited

U.S. PATENT DOCUMENTS

| | | |
|---|---|---|
| 4,195,220 | 3/1980 | Bristol et al. . |
| 4,358,777 | 11/1982 | Bille . |
| 4,460,965 | 7/1984 | Trehn et al. . |
| 4,536,646 | 8/1985 | Adams et al. . |
| 4,549,264 | 10/1985 | Carroll et al. . |
| 4,625,276 | 11/1986 | Benton et al. . |
| 4,710,616 | 12/1987 | Utley . |
| 4,852,000 | 7/1989 | Webb . |
| 4,853,852 | 8/1989 | Rosen . |
| 4,866,611 | 9/1989 | Cree et al. . |
| 4,891,776 | 1/1990 | Kuroki et al. . |
| 4,961,158 | 10/1990 | Sussman . |
| 4,977,520 | 12/1990 | McGaughey, III . |
| 5,007,015 | 4/1991 | Yokozawa . |
| 5,021,952 | 6/1991 | Nishimura et al. . |
| 5,068,787 | 11/1991 | Pipella et al. . |
| 5,093,813 | 3/1992 | Levine . |
| 5,159,180 | 10/1992 | Feiler . |
| 5,229,584 | 7/1993 | Erickson . |
| 5,261,045 | 11/1993 | Scully et al. . |
| 5,267,147 | 11/1993 | Harshaw et al. . |
| 5,493,492 | 2/1996 | Cramer et al. . |

OTHER PUBLICATIONS

"RS–PCM SoundModule U–220 Owners's Manual" Roland Corp. 1989, Cover Page & pp. 3,8,32 and 35–36.
"A.R.T. The Sound of Perfection SGE MACH II User Guide" Art Inc. 1990, Cover Page & pp. 6,26, and 32.

Primary Examiner—Robert A. Weinhardt
Attorney, Agent, or Firm—Watson Cole Stevens Davis, P.L.L.C.

[57] ABSTRACT

A portable timing device stores selectable user, client and activity data. The device has a memory which stores user selected information relating to a user, client and activity along with corresponding start and stop times. The system communicates with a central billing computer over an appropriate two way port which reads and writes to the memory in the device. Also, disclosed is a method for recording provider, client and services in real time employing a streamlined and efficient sequencing of operation.

23 Claims, 4 Drawing Sheets

METHOD AND APPARATUS FOR RECORDING BILLABLE TIME AND SERVICES

This is a continuation of application Ser. No. 08/219,998 filed Mar. 30, 1994, now U.S. Pat. No. 5,493,492.

BACKGROUND OF THE INVENTION

The invention relates to data logging. In particular, the invention relates to a hand held data logging device which records in real time the elapsed time associated with work or billable activities performed on behalf of a client by a service provider or other professional. As will be readily apparent to those skilled in the art, the invention also pertains to a method for recording in real time billable time and services of providers on behalf of clients.

Various data entry systems are available which are designed to simplify the process of collecting time keeper or service provider data associated with various activities. For example, computer systems have been employed to track workers, worker activities and the time spent in handling individual tasks associated with ongoing contracts and the like. These devices often are complicated and require the worker to enter codes or to connect an identification device to a machine during the time of operation. Some devices are designed specifically to provide time and billing information for doctors, lawyers and other professional service providers. However, the systems are difficult to implement and do not carry sufficient information in memory so that user, client and activity information can be readily recorded. Further, such systems do not have the ability to receive updated information or to communicate relevant information to a centrally located time and billing computer.

There is thus a need for a portable data logging device which can record in real time relevant information as to the user, the client, activity and storing elapsed time in a form useful for producing time and billing information.

There is thus a need for a portable data logging device which can record in real time relevant information as to the user, the client, activity and storing elapsed time in a form useful for producing time and billing information. Such a device should incorporate a streamlined and efficient method for recording time, client and provider data.

SUMMARY OF THE INVENTION

The present invention is based upon the discovery that a data logging device for recording in real time the elapsed time spent on a particular activity by a particular service provider for a particular client, may be contained in a portable self-contained unit. The device has a selectable data memory and a memory for storing selected client, user and activity data along with start and stop times time for such activity. The invention allows the user to toggle start and stop times for particular activities, and to store the information in a nonvolatile memory. Updates and corrections to the selectable data are provided by a two way communication port to a separate billing computer. The data logging function is separate from the computer function. Communication with other devices is unnecessary, except when it is desired to read out the recorded data or to update the selectable data.

In one embodiment, the invention is a portable timing device that is designed to interface with the computer for two way communication. The computer lists names, tasks descriptions, and any other text or numerical entries as may be desired. The device transmits user recorded data to the computer for producing bills and charges. The recorded data includes the user, the client, and start and stop times, for various activities performed by the service provider.

In a particular embodiment, the invention is directed to a data logger for recording, in real time, the time expended performing a particular task or activity by a particular user for a client. The invention comprises a central processing unit for processing data, first memory for storing selectable client, user and activity data, a second memory for storing selected client, user and activity data along with start and stop times for computing a corresponding time interval. A data selector is provided for selecting from the first memory data corresponding to a particular client, user and activity. A timer selector provides start and stop times for the selected data into the second memory. Two-way communication means is provided for entering the selectable data into the first memory and for reading out data from the second memory.

In accordance with the invention, there is provided a method for recording in real time billable time, service and provider information for various clients employing a central processing unit including a timer, a first memory, a second memory, a first data selector, a second data selector, each of which is coupled to the CPU. The method further comprises storing selectable data entries corresponding to providers, clients and services in each of a plurality of corresponding selectable lists and selecting and storing an entry from each of said lists, along with corresponding time interval data into the second memory. Selecting the list in the first memory means occurring upon each actuation of the first data selector, and selecting data from each list entry occurring upon actuation of the second data selector for entry into the second memory. Entering start and stop times and the data and time into the second memory occurring upon sequential operations of the timer selector. The method further comprises providing a communication channel coupled to the CPU; entering the selectable data into the first memory and selectively reading out selected portions of the data stored in the second memory. The method further comprises providing data entry blocking means responsive to the timer selector and blocking entry of any data from the first memory into the second memory between the start and stop times. The method further comprises providing a billing computer and coupling the billing computer via the communications channel to the CPU; producing the selectable data in the computer and entering the data into various lists of the first memory and receiving the selected portions of the selected data stored in the second memory.

DESCRIPTION OF THE INVENTION

Figure 1:
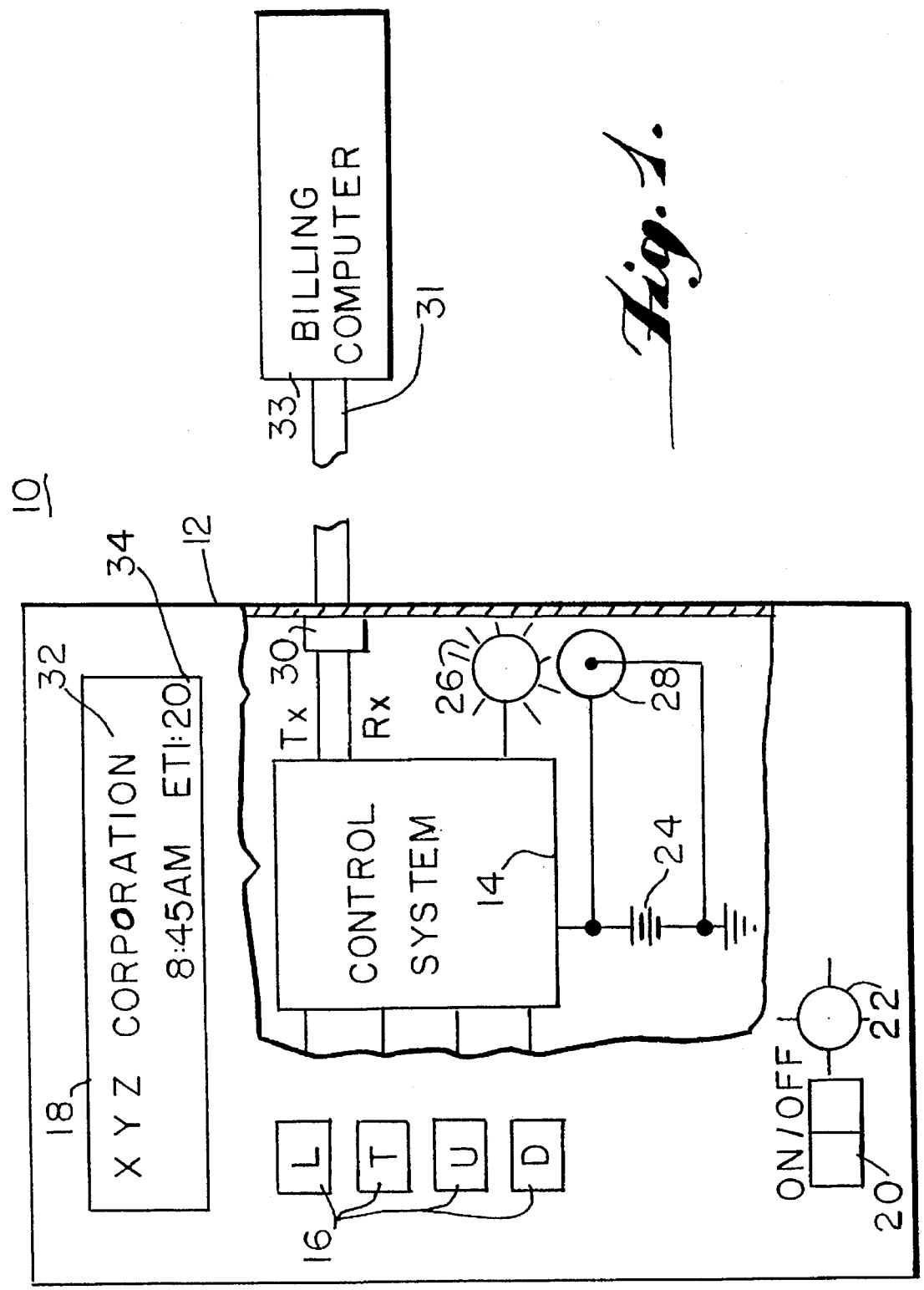
FIG. 1 is a fragmentary plan view of a hand held data logging device according to the invention with the billing computer shown.

The present invention is generally illustrated in FIG. 1 and comprises a hand held data logging device 10 which is more or less the size of a typical hand held calculator. The data logging device 10 includes a housing 12, a control system 14 located in the housing, which is described hereinafter, a plurality of switches 16 individually labeled S, T, U and D, corresponding to select time, up and down functions respectively, hereinafter referred to by function, and a display such as a liquid crystal display 18. An on/off switch 20 which may include an indicator 22 is also provided. The control system has a battery 24, a low battery indicator 26 and a battery charging port 28. There is also provided a data port 30 which may be connected to a standard RS232 cable 31 for communication with a billing computer 33. The control system 14 includes a real time clock, a memory for storing selectable information which may be programmed into a device 10 by an input from the billing computer 31 or from another appropriate source of data. The device 10 stores information relating to, for example, the user or service provider, client or patient and the activity or service provided.

In operation, the user calls up onto the display 18 the user identification by depressing the select switch S. The activation of the select switch S causes the control system 14 to access a list of users, activities or clients. The selected list may be scrolled by pressing the U—Up or D—Down switch in the upper line 32 of the display 18. Alternatively, code numbers for users may be used if desired. The user may scan the list of names accessed by simply depressing the up button U or the down button D. Once the particular user is identified, the activity may be selected by depressing the select switch S again. The control system 14 also calls up the second list which may contain client information. The user likewise selects a particular client by scrolling up or down through the list using the U and D switches respectively. In the illustration of FIG. 1, XYZ Corporation is displayed on the upper line 32. Thereafter, the user enters and moves to the next list by depressing the select switch S thereby again entering that client name and calling up the activity list which likewise may be scrolled for the appropriate activity, for example, a court appearance or the like. Once the activity is selected, the user starts the timing function by depressing the time switch T, which records the selected user, activity and client in the non-volatile memory along with the current time obtained from the real time clock unit. The elapsed time ET is displayed on the lower line 34. The lower line may also be programmed to display a date current time of day, as illustrated. When the task is complete, the user depresses the time switch T again, stopping the elapsed time clock and causing the control system to store the data. The next activity may be timed in the same way with the same or a different client, simply by repeating the steps as desired.

It should be understood that the user data may be pre-stored in the device. For convenience, the prior data is called up each time the select button is depressed so that all the user need do is reactivate the switch to move to the next display. At some later time, device 10 may be coupled to the billing computer 33 by means of the RS232 cable 31, which reads the stored and selected data via port 30. The client list, the time of day, the activities and the user information may also be changed by means of the billing computer 33. It should also be understood that slots are available in each list for miscellaneous items. For example, when a new client consults the service provider, that information can be stored under a series of available unassigned client numbers which later can be formally assigned and entered into an updated list.

Figure 2:
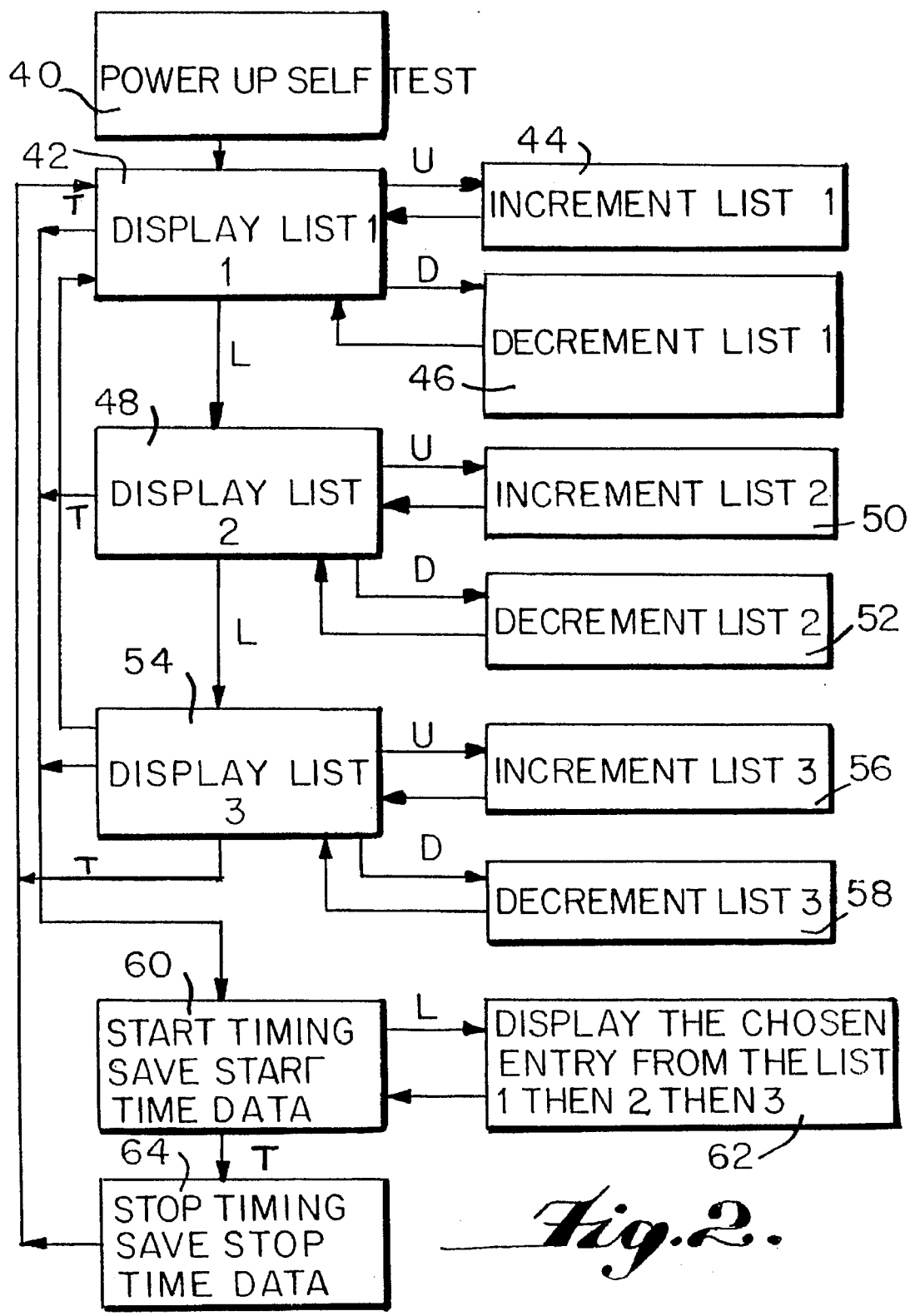
FIG. 2 is a flow chart illustrating the sequence of operations for establishing each new data entry.

The sequence of steps to move through the operation described above is illustrated in the flow chart in FIG. 2. The system powers up at block 40 and either automatically or upon prompting from the switch actuation S displays the first list, for example, the user list, at block 42. Respective increment and decrement blocks 44 and 46 allow the user to scroll the list using the U and D switches. Again, upon actuation of the switch S, the second list is displayed at 48 and which likewise may be incremented up or down by means of the U and D switches at blocks 50 and 52. Likewise, when the user activity is selected block 54 this may be incremented and decremented up or down by means of respective blocks 56 and 68. It should be understood that the activity selected or scanned from any list does not affect the other list. The user may return to any previous box by sequentially actuating the select switch S.

When it is desired to start the timing operation, the user actuates the timer switch T causing the timer to start at 60. If the user desires to review the client activity of the user designation while the timer is operating, sequential operation of the select switch S at block 62 will display the current information on the upper line 32. However, that information may not be changed until the timing stops. This is accomplished at block 64 by actuating the timing switch T which causes the system to stop timing and save the data.

Figure 3:
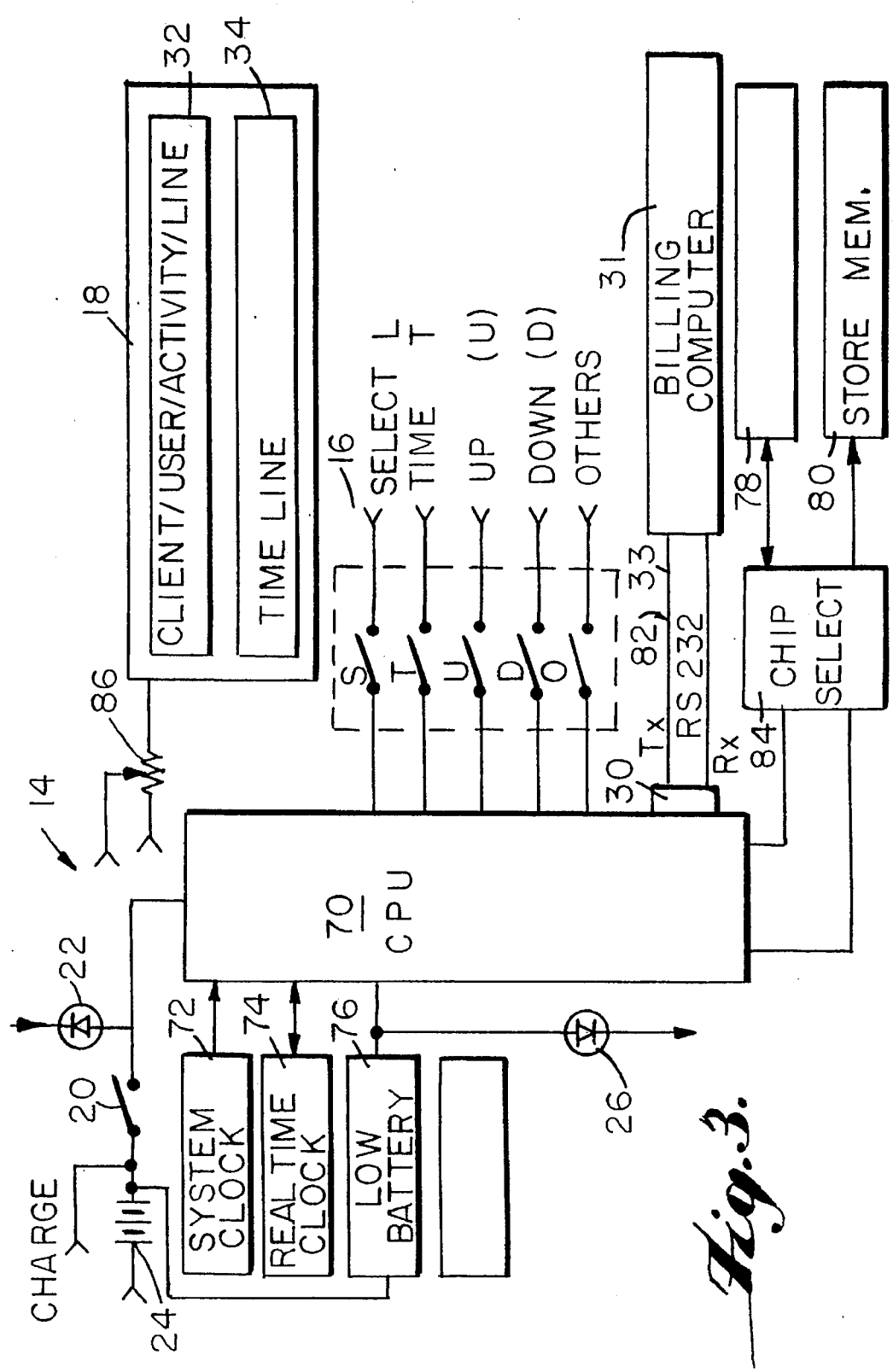
FIG. 3 is a schematic block diagram of a hand held data logging device according to the present invention with the billing computer connected to the device.

A schematic block diagram of an apparatus for implementing the invention is illustrated in FIG. 3, the switch is 16 and the liquid crystal display 18 are illustrated and the billing computer 31 is also shown. The remaining portions of the diagram represents the control system 14.

The control system 14 includes a central processing unit (CPU) 70 which may be part of a microprocessor chip. The CPU 70 has a system clock input 72 which provides a high frequency reference clock signal. A real time clock 74 is also provided. The clock 74 provides the CPU 70 with information as to the actual running time of the device. As indicated by the connecting arrow, the real time clock may be programmed, as desired.

The CPU 70 is powered by the battery 24 or any other suitable power supply. The battery 24 is coupled to the CPU 70 via on/off switch 20. The power on light 22 in circuit with the switch 20 and battery 24 indicates when the switch 20 is closed. The light 22 may be a light emitting diode (LED) as illustrated. When the battery becomes low, a low battery sensor 76 is activated which illuminates indicator 26, which also may be an LED.

The control system 14 includes a selectable memory 78 which stores general information pertaining to user, the clients and the activities. The control system 14 also includes a storage memory 80, which stores information which has been selected during a particular interval for a particular client, activity and user. The selectable memory 78 and the storage memory 80 are both read write devices. Accordingly, when coupled to the billing computer 31 via the port 30, the memories 78 and 80 may be written to, updated or erased. The billing computer 31 and the CPU 30 are coupled by the RS232 cable 33 via the port 30 as noted above. The RS232 port 30 has a transmit line TX and a receive line RX coupled to the CPU 70. Information can thus be communicated to and from the CPU and the associated memory cells in a known manner.

The selectable memory 78 and the storage memory 80 are coupled to the CPU 70 by means of a chip select device 84 which allows the CPU 70 to choose between the selectable memory 78 and storage memory 78 and 80. The chip select 84 also allows subdivisions of the various memories to be accessed. For example, if additional memory cells are necessary for storing additional information, additional memory chips may be employed.

In operation, the user actuates the switches 16 to achieve the select (S) function, the time (T) function, to scroll up (U) function and the scroll down (D) function, as detailed above. Also, as illustrated, one or more other functions (O) may be provided as desired.

A liquid crystal display brightener control 86 coupled to LCD 18 allows the user to select an appropriate or convenient visual intensity of the LCD.

Figure 4:
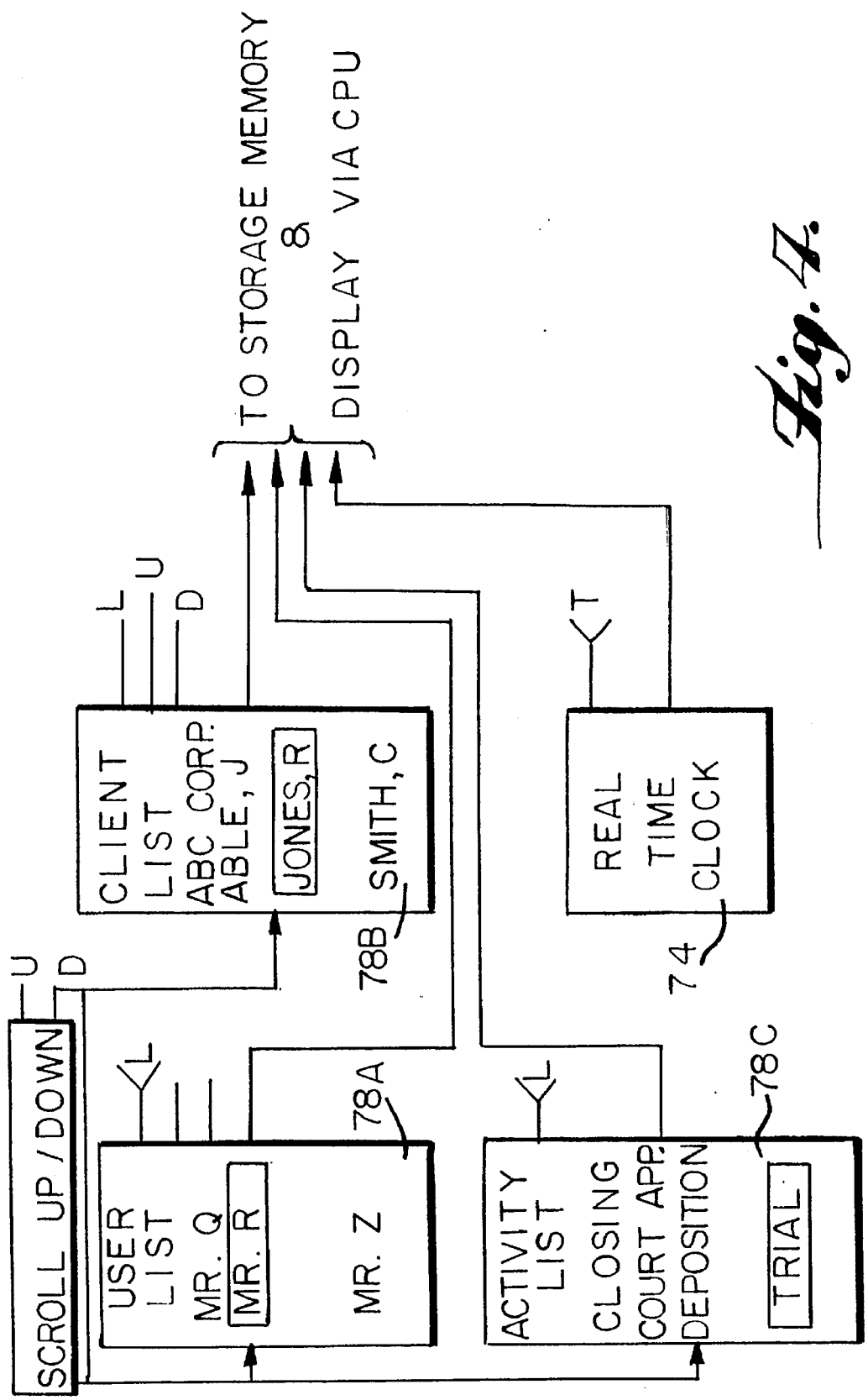
FIG. 4 is an enlarged block diagram illustrating the selectable memory and timer start/stop elements of the system illustrated in FIG. 1.

FIG. 4 illustrates in greater detail the selectable memory 78 for the user list, the client list and activities list which are labeled 78A, 78B and 78C respectively. Each is connected to the select switch S and the up and down scrolling switches U and D. The real time clock 74 provides real time information to the storage memory and the display via the CPU, as noted.

In the example illustrated in FIG. 4, the user list 78 has been selected for Mr. R, the client list has been selected Jones, R. and the activity is a Trial. While the real timer clock 74 is in operation, those selections are locked. However, when the real time clock 74 is released, those selections may then be changed.

While there have been described what are at present considered to be the preferred embodiments of the present invention, it will be apparent those skilled in the art that various changes and modifications may be made therein without departing from the invention, and it is intended in the appended claims to cover such changes and modifications as fall within the spirit and scope of the invention.

What is claimed is:

1. A method for recording billable times and services of a provider for a client comprising the steps of:

providing a central processing unit including timer, first memory, second memory, a first data selector, a second data selector, and a timer selector, each being operatively coupled to the CPU;

storing in the first memory selectable data entries corresponding to the providers, the clients and the services in each of a plurality of corresponding selectable lists;

storing in the second memory a portion of the selectable data from each of said lists along with corresponding time interval data therefor;

selecting upon each sequential actuation of the first data selector, data stored in the first memory corresponding to a particular list;

selecting upon each sequential actuation of the second data selector, data from each list stored in the second memory corresponding to a particular entry in each respective list to be selected;

actuating the timer selector for starting the timer and then actuating the timer selector for stopping the timer; and entering concurrently, actuating the timer selector to stop the timer, start and stop times for the timer for the selected data and the selected data into the second memory.

2. A method according to the claim 1 further comprising providing a communications channel coupled to the CPU;

entering the selectable data into the first memory via said communications channel and reading out selected portions of the selectable data from the second memory via said communications channel.

3. The method according to claim 1 further comprising providing data entry locking means responsive to the timer selector and blocking entry of any data in the first memory into the second memory between the start and stop times.

4. The method of claim 1 wherein the second data selector comprises a pair of switches and selecting the data in the first memory comprises the steps of actuating the first switch for scrolling the list in a first direction and selecting the second switch for scrolling the list in an opposite direction.

5. A method for operating an apparatus for recording a real time billable time, services and providers for clients comprising:

displaying at least one provider from a stored list of providers and incrementing the list until a desired provider is displayed;

displaying at least one client from a stored list of clients and incrementing the list until a desired client is displayed;

displaying at least one service from a list of services and incrementing the list until a desired service is displayed;

actuating a sequentially operable timing switch, a first actuation for starting a timer and recording a start time and a second subsequent actuation for stopping the timer and recording a stop time and concurrently with said second actuation recording the selected provider, client and service; and preventing any change in the selected client, provider and service between the first and second actuations.

6. An apparatus for recording in real time billable time and services of providers for clients comprising:

a central processing unit (CPU) including a timer for producing time interval data;

a first memory coupled to the CPU for storing selectable data entries corresponding to the providers, the clients, and the services in each of a plurality of corresponding selectable lists;

a second memory coupled to the CPU for storing an entry of the selectable data from each of said lists along with corresponding elapsed time interval data;

a first data selector coupled to the CPU being sequentially actuable and operative for selecting upon each sequential actuation thereof data stored in the first memory corresponding to a particular list for entry into the second memory;

a second data selector coupled to the CPU being sequentially actuable and operative for selecting upon sequential actuations thereof data stored in the first memory corresponding to a particular entry in each corresponding list; and a timer selector coupled to the CPU being sequentially actuable and operative successively for starting the timer and then stopping the timer upon sequential actuations thereof, to establish start and stop times for the timer corresponding to the timer interval data for the selected data of the first and second data selector and for entering the time interval data, and the selected data into the second memory upon at least one of said actuations.

7. The apparatus according to claim 6 wherein each of said first and second data selector means and the time selector means comprises a sequentially actuable switch.

8. The apparatus of claim 6 wherein the first memory means comprises a read-write memory for storing the plurality of lists and the first data selector means is operatively coupled to the first memory means for scrolling the lists.

9. The apparatus of claim 6 wherein the second memory means comprises a read-write memory for receiving the selected data along with the time interval data.

10. The apparatus of claim 6 wherein the timer comprises a real time clock coupled to the CPU and wherein the timer selector means is responsive to the real time clock for establishing the time interval data corresponding to the elapsed time.

11. The apparatus of claim 6 wherein the two-way communications channel includes a communications port for access to a remote processing means.

12. The apparatus of claim 11 wherein the communications port comprises an RS232 port.

13. The apparatus of claim 6 wherein the remote processing means comprises a billing computer for writing data to the first memory and reading data from the second memory and for calculating billable time and services in accordance with the data from the second memory.

14. The apparatus of claim 6 further comprises data entry blocking means responsive to the timer selector for blocking entry of any data from the first memory into the second memory between the start and stop time.

15. The apparatus of claim 6 wherein the second data selector is operative for selecting a client, a user and an activity from each corresponding list.

16. The apparatus of claim 6 wherein the second sequentially actuable data selector comprises a first switch for selecting data from the list in a first direction and a second switch for selecting data from the list in an opposite direction.

17. The apparatus of claim 6 further comprising a display for displaying the selected data.

18. The apparatus of claim 6 wherein the first and second memory each comprise a read-write memory.

19. The apparatus of claim 6 further comprising a chip select coupled to the CPU in the first and second memory for selecting therebetween.

20. A method for recording time and services of a provider for a client comprising the steps of:

providing a central processing unit including timer, first memory, second memory, a first data selector, a second data selector, and a timer selector, each being operatively coupled to the CPU;

storing in the first memory selectable data entries corresponding to the providers, the clients and the services in each of a plurality of corresponding selectable lists;

storing in the second memory a portion of the selectable data from each of said lists along with corresponding time interval data therefor;

selecting upon each sequential actuation of the first data selector, data stored in the first memory corresponding to a particular list;

selecting upon each sequential actuation of the second data selector, data from each list stored in the second memory corresponding to a particular entry in each respective list to be selected; actuating the timer selector for starting the timer and then actuating the timer selector for stopping the timer to thereby establish time interval data corresponding to an elapsed time between actuations; and entering upon at least one of said actuations the selected data and the time interval data into the second memory.

21. A method for operating an apparatus for recording time, services and providers for clients comprising:

displaying at least one provider from a stored list of providers and incrementing the list until a desired provider is displayed;

displaying at least one client from a stored list of clients and incrementing the list until a desired client is displayed;

displaying at least one service from a list of services and incrementing the list until a desired service is displayed;

actuating a sequentially operable timing switch, a first actuation for starting a timer and a second subsequent actuation for stopping the timer to thereby establish time interval data corresponding to the elapsed time between said actuations;

recording upon at least one of said actuations the selected provider, client and service and time interval data; and preventing any change in the selected client, provider and service between the first and second actuations.

22. An apparatus for recording data in real time comprising:

a central processing unit (CPU) including a timer for producing time interval data;

a first memory coupled to the CPU for storing selectable data entries corresponding to the providers, the clients, and the services in each of a plurality of corresponding selectable lists;

a second memory coupled to the CPU for storing an entry of the selectable data from each of said lists along with corresponding time interval data;

a first data selector coupled to the CPU being sequentially actuable and operative for selecting upon each sequential actuation thereof data stored in the first memory corresponding to a particular list for entry into the second memory;

a second data selector coupled to the CPU being sequentially actuable and operative for selecting upon sequential actuations thereof data stored in the first memory corresponding to a particular entry in each corresponding list; and a timer selector coupled to the CPU being sequentially actuable and operative successively for starting the timer and then stopping the timer upon sequential actuations thereof to establish the time interval data corresponding to the elapsed time between starting the timer and stopping the timer and for entering the selected data and the time interval data into the second memory.

23. A data logging system comprising:

a timer startable and stopable for producing time interval data;

first memory for storing selectable data entries in each of a plurality of selectable lists;

second memory for storing selected portions of the selectable data from each of said lists along with corresponding time interval data thereof;

sequentially actuable first data selector means operatively coupled to the first memory operative successively for selecting upon sequential actuations thereof data stored in the first memory corresponding to a particular list for entry into the second memory;

sequentially actuable second data selector means operatively coupled to the first memory operative successively for selecting upon sequential actuations thereof data stored in the first memory corresponding to a particular entry in each respective list;

sequentially actuable timer selector means operatively coupled to the timer and the second memory and operative successively for starting and stopping the timer respectively upon single sequential actuations thereof to produce the time interval data and for entering upon at least one of said actuations the time interval data and the data selected by the second data selector means into the second memory.

* * * * *